(12) United States Patent
Nam et al.

(10) Patent No.: US 12,183,939 B2
(45) Date of Patent: Dec. 31, 2024

(54) BIDET

(71) Applicant: COWAY CO., LTD., Gongju-si (KR)

(72) Inventors: Dong Ik Nam, Seoul (KR); Doo Youl Jeon, Seoul (KR); Minsu Song, Seoul (KR); Youngpyo Kim, Seoul (KR)

(73) Assignee: COWAY CO., LTD., Gongju-si (KR)

( * ) Notice: Subject to any disclaimer, the term of this patent is extended or adjusted under 35 U.S.C. 154(b) by 20 days.

(21) Appl. No.: 18/001,428

(22) PCT Filed: Jun. 3, 2021

(86) PCT No.: PCT/KR2021/006921
§ 371 (c)(1),
(2) Date: Dec. 9, 2022

(87) PCT Pub. No.: WO2021/256744
PCT Pub. Date: Dec. 23, 2021

(65) Prior Publication Data
US 2023/0207942 A1    Jun. 29, 2023

(30) Foreign Application Priority Data
Jun. 15, 2020 (KR) .......................... 10-2020-0072456

(51) Int. Cl.
*H01M 50/244* (2021.01)
*E03D 9/08* (2006.01)
*G06F 3/02* (2006.01)

(52) U.S. Cl.
CPC ............ *H01M 50/244* (2021.01); *E03D 9/08* (2013.01); *G06F 3/0202* (2013.01)

(58) Field of Classification Search
CPC .... H01M 50/244; H01M 50/10; H01M 50/20; E03D 9/08; G06F 3/0202; G06F 3/02; Y02E 60/10; Y10S 132/00
USPC .................................................... 4/443–448
See application file for complete search history.

(56) References Cited

FOREIGN PATENT DOCUMENTS

| CN | 201261908 Y | 6/2009 |
|---|---|---|
| JP | 2531376 Y2 | 4/1997 |
| JP | 10-317462 A | 12/1998 |
| JP | 2599859 Y2 | 9/1999 |

(Continued)

OTHER PUBLICATIONS

International Search Report issued Sep. 27, 2021 in PCT/KR2021/006921, filed on Jun. 3, 2021, 2 pages.

*Primary Examiner* — Lori L Baker
(74) *Attorney, Agent, or Firm* — Oblon, McClelland, Maier & Neustadt, L.L.P.

(57) ABSTRACT

A bidet includes: a bidet body part; an operating part; and a power supply part. The operating part includes: an outer housing having a first space formed therein; and a cover covering the opening of the outer housing and being detachably coupled to the outer housing. The power supply part includes: an inner housing, provided in the first space of the outer housing, which has, therein, a second space that is smaller than the first space, and has a first guide member slantedly formed on one side thereof; a battery cartridge, provided in the second space of the inner housing, which has, on the outer surface thereof, a second guide member coupled to the first guide member, and is exposed to the outside with respect to the inner housing according to the second guide member position relative to the first guide member; and a battery in the battery cartridge.

6 Claims, 5 Drawing Sheets

(56) References Cited

FOREIGN PATENT DOCUMENTS

| | | | |
|---|---|---|---|
| JP | 2015-95416 | A | 5/2015 |
| JP | 2019-9039 | A | 1/2019 |
| KR | 10-2013-0048188 | A | 5/2013 |
| KR | 20-2017-0000537 | U | 2/2017 |
| WO | WO-2016185359 | A1 * | 11/2016 |

* cited by examiner (a)

(b)

BIDET

TECHNICAL FIELD

The present disclosure relates to a bidet.

BACKGROUND ART

A bidet is a device that is installed on a toilet seat and can automatically perform anus washing and female local washing by discharging washing water through a nozzle part provided in a bidet body part.

Bidets according to the related art are largely classified into electronic bidets in which a power cord is inserted into an outlet provided in a space (e.g., a toilet) where the bidet is installed and which operate by power received at all times through the power cord, and mechanical bidets that operate only via mechanical components without using electric power. In order to use a bidet in a space where an outlet is not provided, a mechanical bidet that does not use power for operation has mainly been installed. However, the mechanical bidet does not use power, and so operations that can be performed are limited. Thus, a bidet has been developed and used in which power is not supplied from an external power source so that power consumption can be reduced, but in which the bidet operation is not limited by being supplied with power from a battery installed inside the bidet.

In the case of a bidet supplied with power using a battery, the bidet needs to be replaced as the power of the battery is consumed. Thus, a structure for easily detaching the battery for a user's convenience is important.

In addition, in the case of a battery-operated bidet, it is also important to protect a battery and a battery cartridge for accommodating the battery from external moisture.

In the related art, the battery cartridge and the battery are provided inside so as to be protected from external moisture; in particular, there was a lack of recognition for easily separating the battery cartridge and the battery within a limited space.

For example, Korean Patent Laid-open Publication No. 10-2013-0048188 relates to a bidet device that can be operated with a battery and includes a battery case that can be mounted inside a bidet body. However, because the battery case is installed inside the bidet body, the bidet body needs to be separated to detach the battery case, and there is a problem in that it is not easy to detach the battery case, and there is a problem in that it is not easy to detach the battery in a limited space in a structure in which a user inserts a finger into the battery case to separate the battery.

For example, Japanese Patent Laid-open Publication No. 1998-317462 relates to a remote control device, and a battery compartment is formed in a remote controller body, but the battery compartment is provided outside and has a fragile structure that is easily penetrated by external moisture. There is a problem in that it is not easy to detach the battery in a limited space in a structure in which the user inserts a finger into the limited space provided inside the battery compartment to separate the battery.

For example, Japanese Laid-open Patent Document No. 2599859 relates to a battery box for a local area washer, and has the battery box, but it is also provided outside the lower side of an operating panel so that external moisture is vulnerable to penetrate into the battery box and battery.

(Patent document 1) Korean Patent Laid-open Publication No. 10-2013-0048188

(Patent document 2) Japanese Patent Laid-open Publication No. 1998-317462

(Patent document 3) Japanese Patent Laid-open Publication No. 2599859.

DETAILED DESCRIPTION OF THE INVENTION

Technical Problem

The present disclosure has been devised to solve the above problems.

Specifically, the present disclosure provides a structure of an operating part including a battery cartridge having a guide member and a straight guide groove so as to improve a portion where it is difficult to attach/detach the battery cartridge and battery in a limited space.

The present disclosure also provides a structure including a rotation-type guide member so that a user does not need to insert a finger into a limited space during replacement of a battery, and thus the user's finger can be prevented from being caught in the limited space, and therefore the structure is safe.

The present disclosure also provides a structure in which an elastic member is provided so that a cover is opened and simultaneously tension works without additional manipulation and a battery cartridge protrudes upwardly from an operating part, and thus a user's effort to insert a finger and to take out the battery cartridge can be reduced.

The present disclosure also provides a structure in which a battery cartridge is provided inside a housing, whereby external moisture can be prevented from penetrating into the battery cartridge and battery.

Technical Solution

According to an aspect of the present disclosure, there is provided a bidet including: a bidet body part (100) provided at a toilet seat (10); an operating part (300) into which a command for operation of the bidet body part (100) is inputted; and a power supply part (700) supplying power for operation of the operating part (300) and the bidet body part (100), wherein the operating part (300) includes: an outer housing (310) having a first space (311) formed therein; and a cover (320) which covers the opening of the outer housing (310) and which is detachably coupled to the outer housing (310), and the power supply part (700) includes: an inner housing (710), which is provided in the first space (311) of the outer housing (310), has, therein, a second space (711) that is smaller than the first space (311), and has a first guide member (712) slantedly formed on one side thereof; a battery cartridge (720), which is provided in the second space (711) of the inner housing (710), has, on the outer surface thereof, a second guide member (721) coupled to the first guide member (712), and is exposed to the outside with respect to the inner housing (710) according to the second guide member (721) position relative to the first guide member (712); and a battery provided in the battery cartridge (720).

An elastic member (730) may be installed between the battery cartridge (720) and the inner housing (710) in the second space (711).

The battery cartridge (720) may be rotated with respect to the inner housing (710) depending on a relative position of the second guide member (721) with respect to the first guide member (712) so that the battery cartridge (720) is exposed to an outside with respect to the inner housing (710), and the second guide member (721) may be eccentric to one side with respect to longitudinal and latitudinal directions of the battery cartridge (720).

The second guide member (721) may be eccentric upward with respect to the latitudinal direction of the battery cartridge (720).

The first guide member (712) may be slantedly formed in the upward direction, and the battery cartridge (720) may be rotated with respect to the longitudinal and latitudinal directions.

The first guide member (712) may be a guide groove passing through the inner housing (710), and the second guide member (721) may be a guide protrusion inserted into the guide groove.

Effects of the Invention

According to the present disclosure, the following effects are achieved.

According to the present disclosure, the effect is achieved that a structure of an operating part is provided which includes a battery cartridge having a guide member and a straight guide groove so as to improve a portion where it is difficult to attach/detach the battery cartridge and battery in a limited space.

In addition, according to the present disclosure, the effect is achieved that a structure is provided which includes a rotation-type guide member so that a user does not need to insert a finger into a limited space during replacement of a battery, and thus the user's finger can be prevented from being caught in the limited space, and therefore the structure is safe.

In addition, according to the present disclosure, the effect is achieved that a structure is provided in which an elastic member is provided so that a cover is opened and simultaneously tension works without additional manipulation and a battery cartridge protrudes upwardly from an operating part, and thus a user's effort to insert a finger and to take out the battery cartridge can be reduced.

In addition, according to the present disclosure, the effect is achieved that a structure is provided in which a battery cartridge is provided inside a housing, whereby external moisture can be prevented from penetrating into the battery cartridge and battery.

MODE OF THE INVENTION

Hereinafter, the present disclosure will be described in detail with reference to the accompanying drawings.

Figure 1:
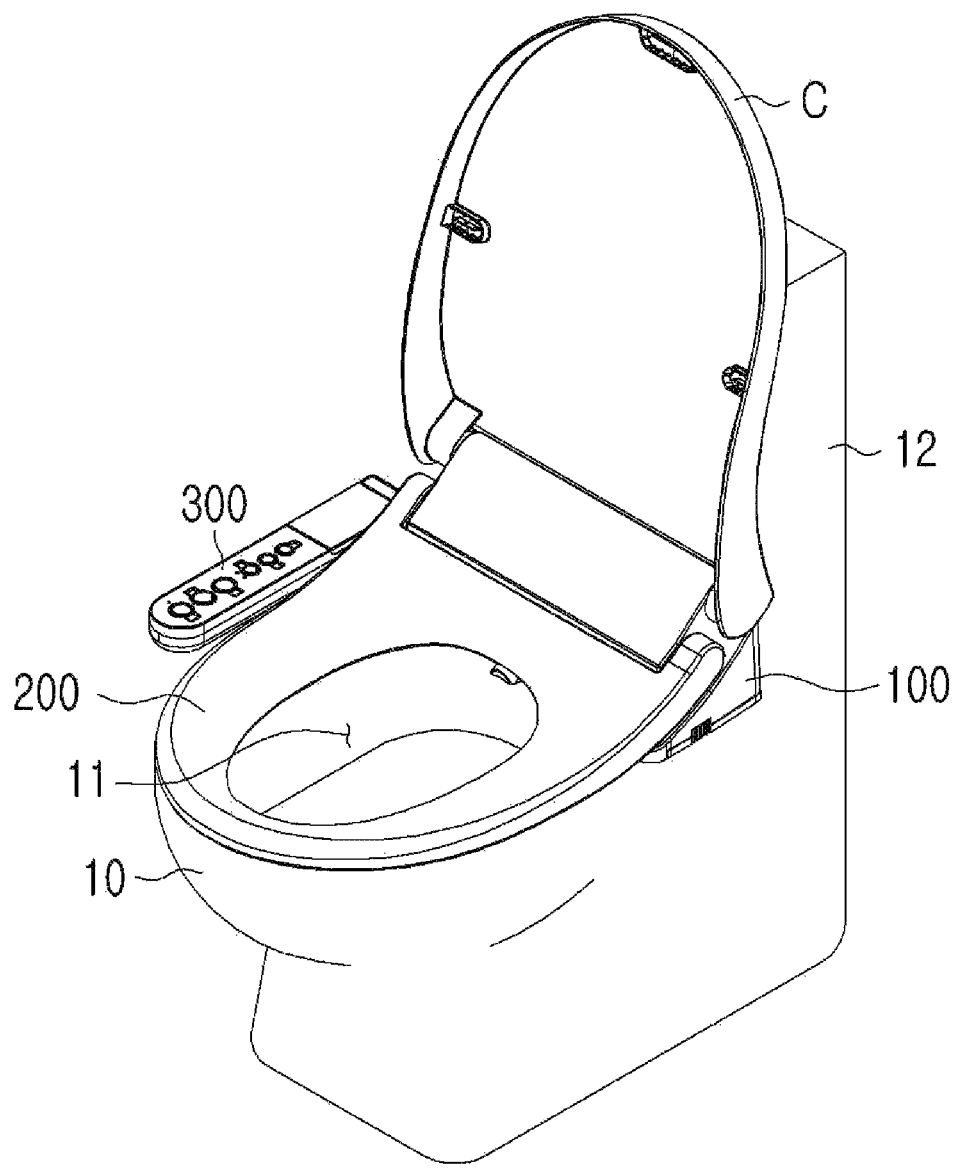
FIG. 1 is a view for explaining a state where a bidet is installed in a toilet seat according to an embodiment.

A bidet according to an embodiment of the present disclosure is installed in a toilet seat 10, and referring to FIG. 1, the bidet may include a bidet body part 100, a seat part 200, a cover part C, an operating part 300, and a power supply part 700.

The bidet body part 100 is installed in the toilet seat 10, and is a part for an operation of the bidet.

The seat part 200 that is a part on which a user is seated, is hinge-coupled to the bidet body part 100 so as to be rotatable with respect to the bidet body part 100.

The cover part C is hinge-coupled to the bidet body part 100 so as to be rotatable with respect to the bidet body part 100.

The cover part C may be rotated with respect to the bidet body part 100 between a position where the inputting part 11 of the toilet seat 10 is covered, and a position where the inputting part 11 is opened, like in the seat part 200.

Figure 2:
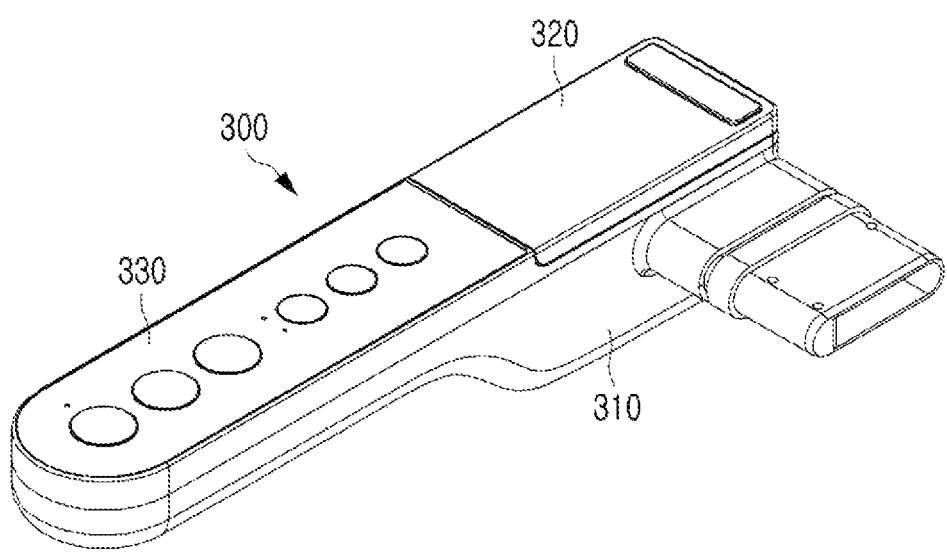
FIG. 2 is a view for explaining an operating part of FIG. 1.

FIG. 2 is a view for explaining the operating part 300.

The operating part 300 is a part connected to a side surface of the bidet body part 100, and a command for an operation of the bidet body part 100 is inputted.

The operating part 300 includes an outer housing 310, a cover 320, and an operating panel 330.

The outer housing 310 is a housing for covering an outside of the operating part 300, and a first space 311 is formed in the outer housing 310.

The first space 311 is a space in which an inner housing 710 to be described later is mounted.

The cover 320 covers an opening of the outer housing 310 and is detachably coupled to the outer housing 310.

In this case, the cover 320 may be coupled to the outer housing 310 by using a screw, but the present disclosure is not limited thereto, and the cover 320 is not limited to any method whereby the cover 320 may be coupled to the outer housing 310.

The operating panel 330 is formed at one side of the outer housing 310, and a plurality of buttons for an operation of the bidet are provided, and a user may input information for performing the operation of the bidet through the plurality of buttons.

The power supply part 700 is a part for supplying direct current (DC) power for the operation of the bidet. The bidet according to an embodiment of the present disclosure may be driven only with power supplied by the power supply part 700 without a separate power source, and to this end, one or more batteries are installed in the power supply part 700.

The power supply part 700 supplies power for operations of the bidet body part 100 and the operating part 300.

The power supply part 700 includes an inner housing 710, a battery cartridge 720, an elastic member 730, and a battery.

The inner housing 710 is a housing installed in the first space 311 of the outer housing 310.

Figure 3:
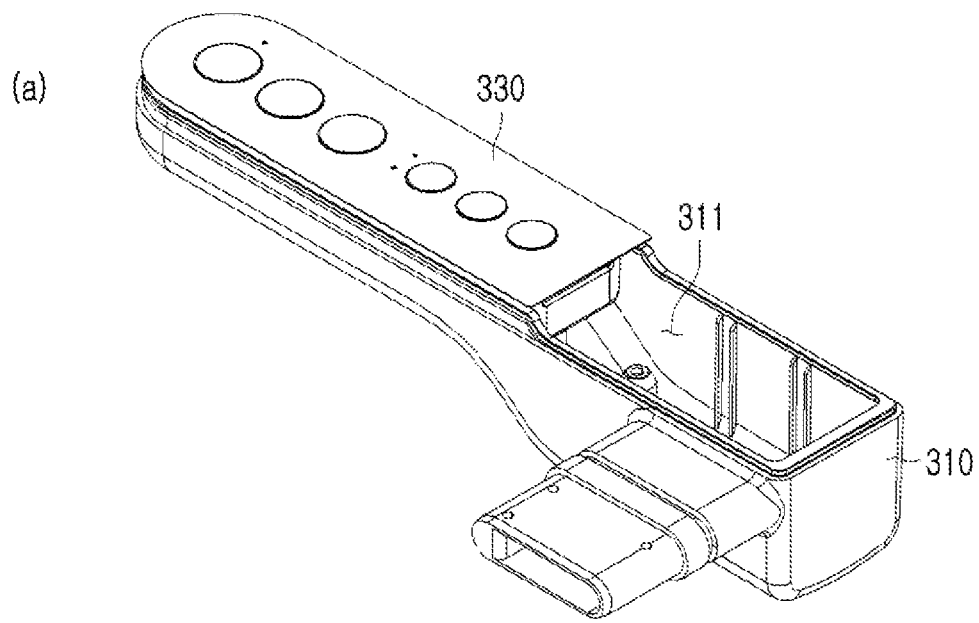
FIG. 3 is a view for explaining a first space and a second space.
Figure 3:
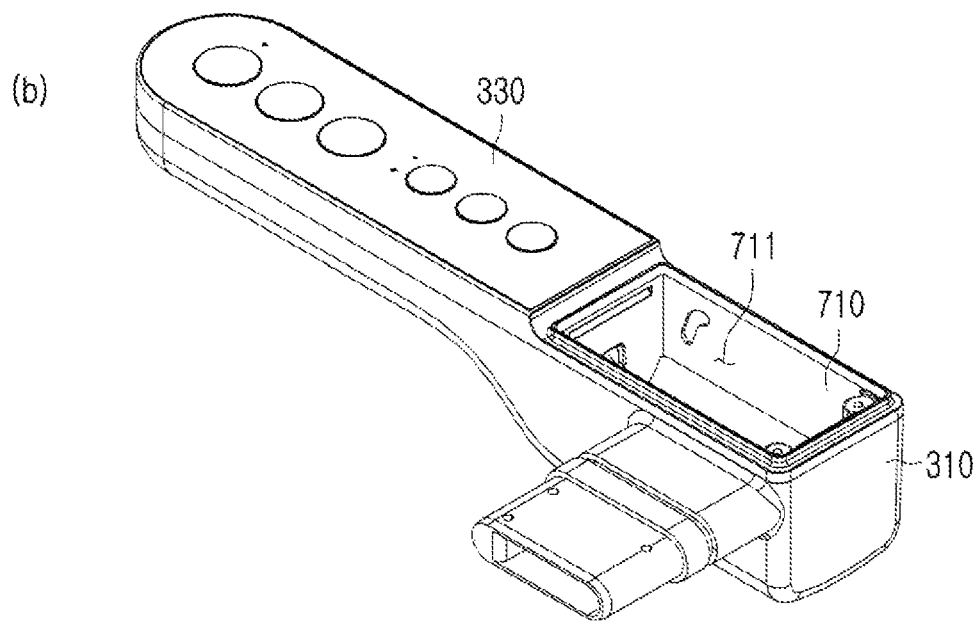

A second space 711 that is smaller than the first space 311 is formed in the inner housing 710, and referring to FIG. 3, the first space 311 and the second space 711 are shown.

The second space 711 is a space in which the battery cartridge 720 to be described later is mounted.

A first guide member 712 is slantedly formed on one side of the inner housing 710.

The first guide member 712 is slantedly formed in the inner housing 710 and extends in an upward direction, and is coupled to the second guide member 721 to be described later. This will be described below.

Figure 4:
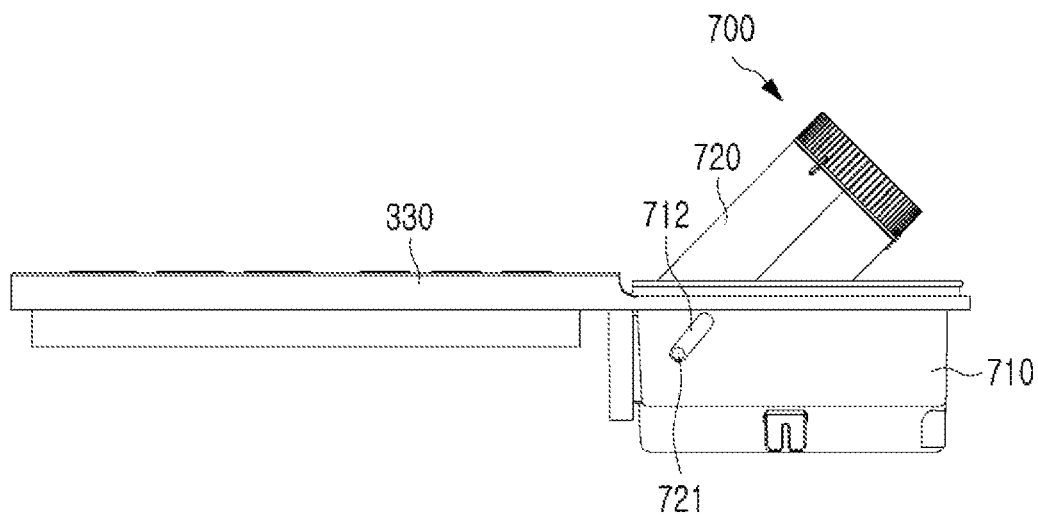
FIG. 4 is a view for explaining a guide member.

Referring to FIG. 4, the first guide member 712 is shown in a straight line form formed in one direction.

However, the shape and position of the first guide member 712 are not limited to the illustration. For example, the first guide member 712 may be formed in a multi-directional curve form.

Figure 5:
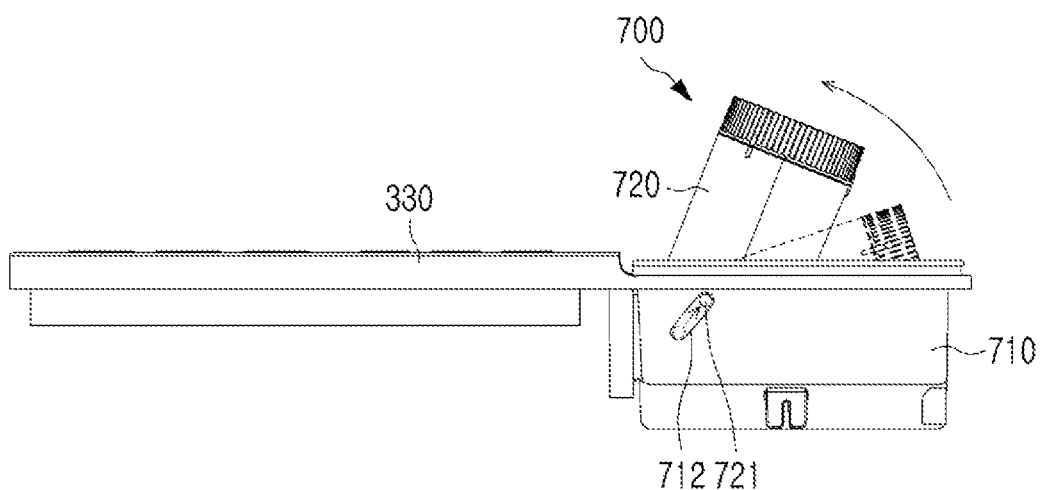
FIG. 5 is a view for explaining that a battery cartridge is rotated with respect to an inner housing.

The battery cartridge 720 will be described with reference to FIGS. 4 through 6.

One or more batteries may be installed in the battery cartridge 720.

The battery cartridge 720 is installed in the second space 711 of the inner housing 710.

A second guide member 721 to be coupled to the first guide member 712 is formed on an outer side of the battery cartridge 720.

FIG. 4 is a view for explaining a guide member, and the first guide member 712 is a guide groove passing through the inner housing 710, and the second guide member 721 is a guide protrusion inserted into the guide groove. However, any structure in which the first guide member 712 and the second guide member 721 are coupled to each other is possible, and the present disclosure is not limited thereto.

When the second guide member 721 is coupled to the first guide member 712, the second guide member 721 may protrude from an outside of the inner housing 710.

The second guide member 721 may be eccentric to one side with respect to longitudinal and latitudinal directions of the battery cartridge 720, however, the present disclosure is not limited thereto. This will be described below.

Figure 6:
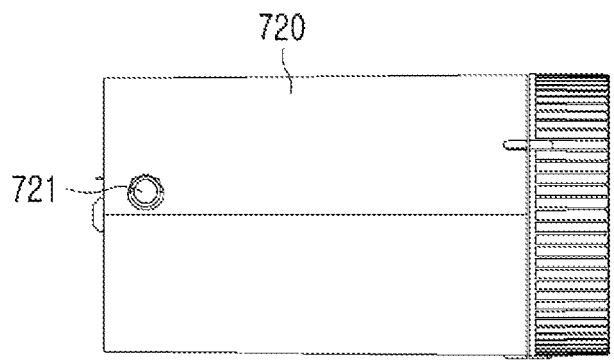
FIG. 6 is a view for explaining the battery cartridge.

In this case, FIG. 6 illustrates the second guide member 721 having a circular protrusion shape, but the second guide member 721 may have a structure in which the user may grasp the second guide member 721, and the present disclosure is not limited thereto.

In this case, the battery cartridge 720 may have a structure in which a battery may be accommodated, and the present disclosure is not limited to a specific structure.

A case where the battery cartridge 720 is rotated with respect to the inner housing 710 will be described with reference to FIG. 5.

The battery cartridge 720 is rotated with respect to the inner housing 710 depending on the relative position of the second guide member 721 to the first guide member 712 so as to be exposed to the outside with respect to the inner housing 710.

That is, the user may rotate the battery cartridge 720 while moving the second guide member 721 along the first guide member 712.

In this case, because the first guide member 712 is slantedly formed in the upward direction, the battery cartridge 720 is rotated upwards to be exposed to the outside with respect to the inner housing 710.

Considering that the inner housing 710 is miniaturized for cost reduction and miniaturization of a bidet device, the space of the inner housing 710 in which the battery cartridge 720 is mounted has limited space. In this space, in order to separate the battery cartridge 720 by rotating the battery cartridge 720, it is necessary that the battery cartridge 720 is not constrained by the inner housing 710.

The battery cartridge 720 is formed such that the first guide member 712 is inclined upward, so that when the second guide member 721 moves along the first guide member 712, the battery cartridge 720 may be pushed upward.

Thus, the battery cartridge 720 may rotate in the lateral and longitudinal directions while moving in the longitudinal direction with respect to the inner housing 710, and the battery cartridge 720 is not constrained to the inner housing 710, and the battery cartridge 720 may be easily detached in a limited space.

In addition, when the user grips the second guide member 721 protruding from the outside of the inner housing 710 and moves the second guide member 721 along the first guide member 712, the battery cartridge 720 may be separated from the inner housing 710. Thus, the effect is achieved of reducing the user's effort to take out the battery cartridge 720 in a narrow space by inserting a finger according to the related art.

FIG. 6 is a view for explaining an eccentric structure of the battery cartridge 720.

The second guide member 721 may be eccentric to one side with respect to the longitudinal and latitudinal directions of the battery cartridge 720.

At this time, the second guide member 721 may be formed to be eccentric upward with respect to the latitudinal direction of the battery cartridge 720.

Because the second guide member 721 is formed to be eccentric to one side, particularly upward, with respect to the battery cartridge 720, compared to the case where the second guide member 721 is formed to the lower side and the center with respect to the battery cartridge 720, a rotation radius of the battery cartridge 720 relative to the inner housing 710 may be reduced.

Thus, even when the angle at which the battery cartridge 720 is rotated is small, the battery cartridge 720 is exposed to the outside of the inner housing 710, so that the user can easily attach and detach the battery cartridge 720, and while the battery cartridge 720 is rotated, the battery cartridge 720 does not interfere with the inner housing 710, and thus the battery cartridge 720 may be rotated in the limited space.

Thus, even within the limited space, the battery cartridge 720 may be rotated and exposed to the outside of the inner housing 710 so that the size of the control part 300 can be further miniaturized.

According to another embodiment of the present disclosure, the bidet may further include an elastic member 730 installed between the battery cartridge 720 and the inner housing 710 in the second space 711.

Figure 7:
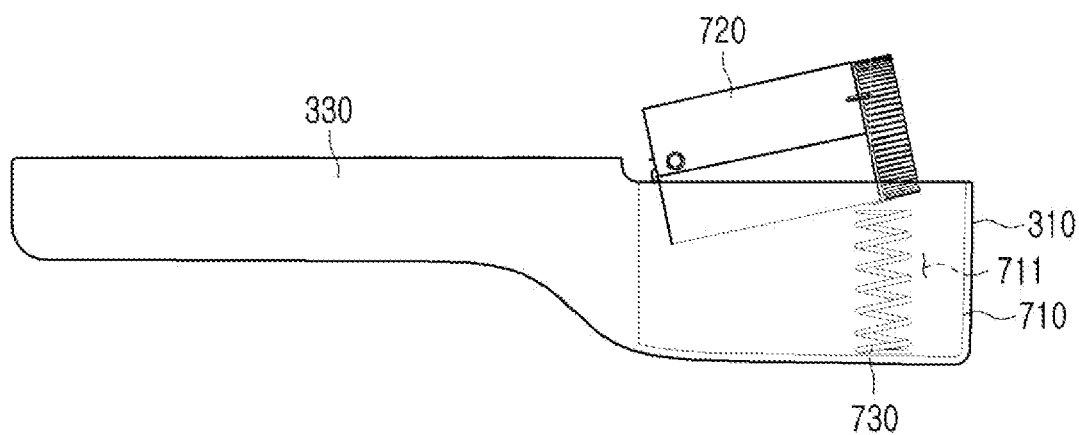
FIG. 7 is a view for explaining that an elastic member is installed in the second space.

The elastic member 730 will be described with reference to FIG. 7.

The elastic member 730 is a material having elasticity, and the present disclosure is not limited to a specific material as long as the elastic member 730 is formed of a material having an elastic modulus such as a spring.

The elastic member 730 has elastic energy and is located below the battery cartridge 720, and when the cover 320 is closed, the elastic member 730 contracts, but when the cover 320 is separated from the outer housing 310, the elastic member 730 is stretched, the elastic member 730 pushes the battery cartridge 720 upward with energy to return to its original state, which is not contracted, so that the battery cartridge 720 can be exposed upward. That is, when the user opens the cover 320, the battery cartridge 720 can be separated from the inner housing 710, and thus the battery cartridge 720 can be easily detached.

In this case, the elastic member 730 is not limited to the illustrated position.

As described above, the present disclosure has been described with respect to the structure for easily separating the battery cartridge 720, but it can be applied to all methods for separating objects in a limited space.

While the present invention has been particularly shown and described with reference to exemplary embodiments thereof, it will be understood by those of ordinary skill in the art that various changes in form and details may be made therein without departing from the spirit and scope of the present invention as defined by the following claims.

EXPLANATION OF REFERENCE NUMERALS

10: toilet seat
11: inputting part

12: water tank
100: bidet body part
200: seat part
300: operating part
310: outer housing
311: first space
320: cover
330: operating panel
700: power supply part
710: inner housing
711: second space
712: first guide member
720: battery cartridge
721: second guide member
730: elastic member
C: cover part

The invention claimed is:

1. A bidet comprising:
a bidet body part provided at a toilet seat;
an operating part into which a command for operation of the bidet body part is inputted; and
a power supply part supplying power for operation of the operating part and the bidet body part,
wherein the operating part includes:
   an outer housing having a first space formed therein; and
   a cover which covers the opening of the outer housing and which is detachably coupled to the outer housing, and
the power supply part includes:
   an inner housing, which is provided in the first space of the outer housing, has, therein, a second space that is smaller than the first space, and has a first guide member slantedly formed on one side thereof;
   a battery cartridge, which is provided in the second space of the inner housing, has, on the outer surface thereof, a second guide member coupled to the first guide member, and is exposed to the outside with respect to the inner housing according to the second guide member position relative to the first guide member in a state where the second guide member is coupled to the first guide member; and
   a battery provided in the battery cartridge.

2. The bidet of claim 1, wherein an elastic member is installed between the battery cartridge and the inner housing in the second space.

3. The bidet of claim 1, wherein the battery cartridge is rotated with respect to the inner housing depending on a relative position of the second guide member with respect to the first guide member so that the battery cartridge is exposed to an outside with respect to the inner housing, and the second guide member is eccentric to one side with respect to longitudinal and latitudinal directions of the battery cartridge.

4. The bidet of claim 3, wherein the second guide member is eccentric upward with respect to the latitudinal direction of the battery cartridge.

5. The bidet of claim 3, wherein the first guide member is slantedly formed in the upward direction, and the battery cartridge is rotated with respect to the longitudinal and latitudinal directions.

6. The bidet of claim 1, wherein the first guide member is a guide groove passing through the inner housing, and the second guide member is a guide protrusion inserted into the guide groove.

* * * * *